United States Patent
Miller et al.

(10) Patent No.: US 9,658,686 B2
(45) Date of Patent: May 23, 2017

(54) MOTION BASED VIEW MATRIX TUNING

(71) Applicant: MICROSOFT TECHNOLOGY LICENSING, LLC, Redmond, WA (US)

(72) Inventors: Quentin Simon Charles Miller, Sammamish, WA (US); Drew Steedly, Redmond, WA (US); Denis Demandolx, Bellevue, WA (US); Youding Zhu, Sammamish, WA (US); Qi Kuan Zhou, Bellevue, WA (US); Todd Michael Lyon, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/724,545

(22) Filed: May 28, 2015

(65) Prior Publication Data

US 2016/0349837 A1    Dec. 1, 2016

(51) Int. Cl.
| | | |
|---|---|---|
| *G06F 3/01* | (2006.01) | |
| *G02B 27/01* | (2006.01) | |
| *G06T 19/00* | (2011.01) | |
| *H04N 13/00* | (2006.01) | |
| *H04N 13/04* | (2006.01) | |

(52) U.S. Cl.
CPC .......... *G06F 3/012* (2013.01); *G02B 27/0172* (2013.01); *G06T 19/006* (2013.01); *H04N 13/0011* (2013.01); *H04N 13/044* (2013.01); *H04N 13/0497* (2013.01);
(Continued)

(58) Field of Classification Search
CPC ... G06F 3/012; G02B 27/017; G02B 27/0172; G02B 2027/014; G02B 2027/0178; G06T 19/006
See application file for complete search history.

(56) References Cited

U.S. PATENT DOCUMENTS

| | | | |
|---|---|---|---|
| 5,446,834 | A | 8/1995 | Deering |
| 8,581,905 | B2 | 11/2013 | Mitchell |

(Continued)

FOREIGN PATENT DOCUMENTS

| | | |
|---|---|---|
| EP | 0817123 A1 | 1/1998 |
| EP | 2765776 A1 | 8/2014 |

(Continued)

OTHER PUBLICATIONS

"Oculus VR-SDK API Overview", Published on: Apr. 14, 2014' Available at: http://static.oculusvr.com/sdk-downloads/documents/Oculus_SDK_Overview_0.3.1_Preview.pdf.
(Continued)

*Primary Examiner* — Lixi C Simpson
(74) *Attorney, Agent, or Firm* — Alleman Hall Creasman & Tuttle LLP

(57) ABSTRACT

Various embodiments relating to using motion based view matrix tuning to calibrate a head-mounted display device are disclosed. In one embodiment, the holograms are rendered with different view matrices, each view matrix corresponding to a different inter-pupillary distance. Upon selection by the user of the most stable hologram, the head-mounted display device can be calibrated to the inter-pupillary distance corresponding to the selected most stable hologram.

20 Claims, 9 Drawing Sheets

(52) U.S. Cl.
CPC ............ *G02B 2027/014* (2013.01); *G02B 2027/0174* (2013.01); *G02B 2027/0178* (2013.01)

(56) References Cited

U.S. PATENT DOCUMENTS

| | | | |
|---|---|---|---|
| 8,786,675 B2 | 7/2014 | Deering | |
| 2010/0097671 A1 | 4/2010 | Leister | |
| 2011/0304647 A1 | 12/2011 | Noge | |
| 2013/0050642 A1 | 2/2013 | Lewis et al. | |
| 2013/0050833 A1 | 2/2013 | Lewis et al. | |
| 2013/0113784 A1 | 5/2013 | White et al. | |
| 2013/0321255 A1 | 12/2013 | Lamb et al. | |
| 2014/0152558 A1 | 6/2014 | Salter et al. | |
| 2014/0274391 A1* | 9/2014 | Stafford | G02B 27/0081 463/32 |
| 2016/0012643 A1* | 1/2016 | Kezele | G06T 19/006 345/633 |
| 2016/0131902 A1* | 5/2016 | Ambrus | G02B 27/0093 345/156 |

FOREIGN PATENT DOCUMENTS

| | | |
|---|---|---|
| JP | 4743818 B2 | 8/2011 |
| WO | 2012062681 A1 | 5/2012 |
| WO | 2014155072 A2 | 10/2014 |
| WO | 2014156033 A1 | 10/2014 |

OTHER PUBLICATIONS

Steptoe, William, "William Steptoe—AR-Rift: Aligning Tracking and Video Spaces", Published on: Nov. 27, 2013 Available at; http://willsteptoe.com/.

Davis, Brad, "Understanding Matrix Transformations for Rendering to the Oculus Rift", Published on: Oct. 14, 2013 Available at: http://rifty-business.blogspot.in/2013/10/understanding-matrix-transformations.html.

Li, et al., "Minication Affects Action-Based Distance Judgments in Oculus Rift HMDs", In Proceedings of the ACM Symposium on Applied Perception, Aug. 8, 2014, pp. 91-94.

Wilson, et al., "Steerable Augmented Reality with the Beamatron", In Proceedings of the 25th annual ACM symposium on User interface software and technology, Oct. 7, 2012, 10 pages.

Duchowski, et al., "Binocular Eye Tracking in VR for Visual Inspection Training", In Proceedings of the ACM symposium on Virtual reality software and technology, Nov. 15, 2001, 8 pages.

Azuma, et al., "Improving Static and Dynamic Registration in an Optical See-through HMD", In Proceedings of the 21st annual conference on Computer graphics and interactive techniques, Jul. 24, 1994, 17 pages.

Liu, et al., "An Optical See-Through Head Mounted Display with Addressable Focal Planes", In 7th IEEE/ACM International Symposium on Mixed and Augmented Reality, Sep. 15, 2008, pp. 33-42.

Aliaga, Daniel G., "Virtual and Real Object Collisions in a Merged Environment", In Master's Thesis, Retrieved on: Nov. 13, 2014, 59 pages.

Antonov, et al., "SDK Overview SDK Version 0.2.5", Published on: Oct. 9, 2013 Available at: http://static.oculusvr.com/sdk-downloads/documents/Oculus_SDK_Overview.pdf.

Best, Scot, "Perceptual and Oculomotor Implications of Interpupillary Distance Settings on a Head-Mounted Virtual Display", In Proceedings of the IEEE 1996 National Aerospace and Electronics Conference, vol. 1, May 20, 1996, 6 pages.

Whiting, Nick, "Integrating the Oculus Rift into Unreal Engine 4", Published on: Jun. 11, 2013, Available at: http://gamasutra.com/blogs/NickWhiting/20130611/194007/Integrating_the_Oculus_Rift_into_Unreal_Engine_4.php.

ISA European Patent Office, International Search Report and Written Opinion Issued in PCT Application No. PCT/US2016/030338, Sep. 7, 2016, WIPO, 12 pages.

* cited by examiner

MOTION BASED VIEW MATRIX TUNING

BACKGROUND

Recently, various technologies have emerged that allow users to experience a blend of reality and virtual worlds. For example, head-mounted display (HMD) devices may include high definition cameras, depth cameras, range finders, gyroscopes, accelerometers, and other technologies that allow the HMD device to map the real world and to display a blend of reality and virtual objects on the HMD device. These HMD devices may include stereoscopic displays that use stereopsis to achieve 3D visuals by displaying separate images with appropriately translated positions to each eye of the user. When using stereopsis techniques, the perceived depth of the 3D visual will depend upon the inter-pupillary distance (IPD) of the user. Rather than calculating an accurate IPD for the user, stereoscopic HMD devices will often be calibrated to an average IPD for a population of users. Differences between a user's actual IPD and the average IPD may result in some changes in how the visuals are perceived by the user, as discussed below; however, those changes may be imperceptible when viewing an immersive virtual reality experience, as opposed to augmented reality experience, because the user has no frame of reference in the real world against which the displayed visuals can be compared. However, even in a virtual reality experience, an incorrect IPD may cause user discomfort. Additionally, if the IPD error is too large, the user may be unable to verge the left and right images displayed to the user's left and right eyes, causing the user to see double, and generally degrading the user's experience of the virtual reality.

The approach of using an average IPD for a user population has several drawbacks in HMD devices for displaying augmented reality experiences, which comprise at least partially see-through displays that allow superposition of displayed images over a real-world background environment. As the user is seeing the real-world, and not just a virtual representation of the real-world on a display, the real-world background environment provides a ground truth reference frame for the user. A deviation between the user's actual IPD and the IPD used by the HMD device will affect only the user's perception of the virtual objects displayed on the HMD device, while the ground truth real-world background environment will remain unchanged. Consequently, this imprecision in IPD can cause the virtual objects to either appear to be an incorrect size or appear to be in an incorrect location compared to the real-world background environment, degrading the user experience.

SUMMARY

To address these issues, a head-mounted display device (HMD device) and method are provided for motion based view matrix tuning. The HMD device may comprise a processor and a non-volatile storage device holding instructions executable by the processor to detect a reference location that is at least a threshold distance away from a rendering focal plane of the head mounted display device, generate a first plurality of view matrices, each view matrix corresponding to a different inter-pupillary distance within a first range of inter-pupillary distances, render a first plurality of holograms, each hologram rendered using a different view matrix from the first plurality of view matrices, display the first plurality of holograms on the display at the reference location, output a first instruction to a user of the head mounted display device to move the user's head while viewing the first plurality of holograms and to select a hologram from among the first plurality of holograms with a most stable appearance, determine a calibrated inter-pupillary distance based on the view matrix of the selected hologram, and calibrate the head mounted display device based on the calibrated inter-pupillary distance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present description relates to motion based view matrix tuning of a head-mounted display (HMD) device to provide an immersive augmented reality experience that is calibrated to the user's inter-pupillary distance to reduce eye strain and promote consistent quality of operation. More particularly, the present description relates to rendering a plurality of holograms, each hologram rendered using a different view matrix corresponding to a different inter-pupillary distance within a range of inter-pupillary distances. The user may then select the hologram that has the most stable appearance, which will be the hologram rendered with an inter-pupillary distance closest to the user's actual inter-pupillary distance. This will allow the HMD device to be accurately calibrated to the user's actual inter-pupillary distance.

Figure 1:
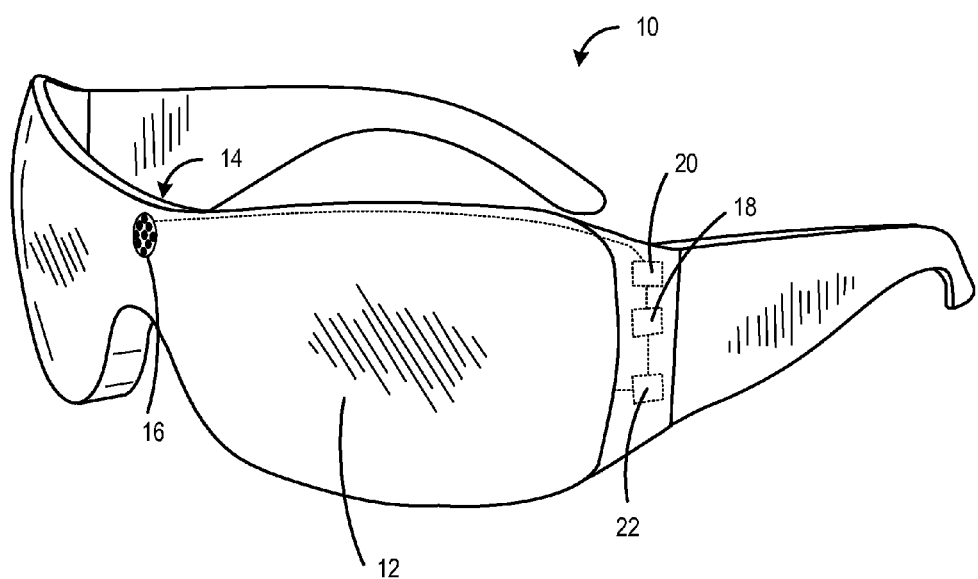
FIG. 1 shows a head-mounted display system according to an embodiment of the present description.

FIG. 1 illustrates an example HMD device 10. The illustrated HMD device 10 takes the form of wearable glasses or goggles, but it will be appreciated that other forms are possible. The HMD device 10 includes an at least partially see-through stereoscopic display 12 that may be configured to visually augment an appearance of a physical environment being viewed by the user through the at least partially see-through stereoscopic display. In some examples, the at least partially see-through stereoscopic display 12 may include one or more regions that are transparent (e.g., optically clear) and may include one or more regions that are opaque or semi-transparent. In other examples, the at least partially see-through stereoscopic display 12 may be transparent (e.g., optically clear) across an entire usable display surface of the stereoscopic display 12.

For example, the HMD device 10 may include an image production system 22 that is configured to display virtual objects to the user with the at least partially see-through stereoscopic display 12, which are visually superimposed onto the physical environment so as to be perceived at various depths and locations. The HMD device 10 may use stereoscopy to visually place a virtual object at a desired depth by displaying separate images of the virtual object to both of the user's eyes. To achieve the perception of depth, the image production system 22 of the HMD device 10 may render the two images of the virtual object at a rendering focal plane of the HMD device 10, such that there is a binocular disparity between the relative positions of the virtual object in the two images. For example, this binocular disparity may be a horizontal disparity where the relative positions of the virtual object in the two images is separated by a distance in the x axis direction. In this embodiment, the x axis may be defined as the axis extending to the left and the right relative to the user, the y axis extending upward and downward relative to the user, and the z axis extending forward and backward relative to the user.

The horizontal disparity between the relative positions of the virtual object in the two images will cause the user to perceive that the virtual object is located at a certain depth within the viewed physical environment due to stereopsis. Using this stereoscopy technique, the HMD device 10 may control the displayed images of the virtual objects, such that the user will perceive that the virtual objects exist at a desired depth and location in the viewed physical environment.

The HMD device 10 includes an optical sensor system 14 that may include one or more optical sensors. In one example, the optical sensor system 14 includes an outward facing optical sensor 16 that may be configured to detect the real-world background from a similar vantage point (e.g., line of sight) as observed by the user through the at least partially see-through stereoscopic display 12. The optical sensor system 14 may include a variety of additional sensors, such as a depth camera and an RGB camera, which may be a high definition camera or have another resolution.

The HMD device 10 may further include a position sensor system 18 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 14 and/or position sensor information received from position sensor system 18 may be used to assess a position and orientation of the vantage point of the at least partially see-through stereoscopic display 12 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system (e.g., on-board computing system 20) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

Figure 2:
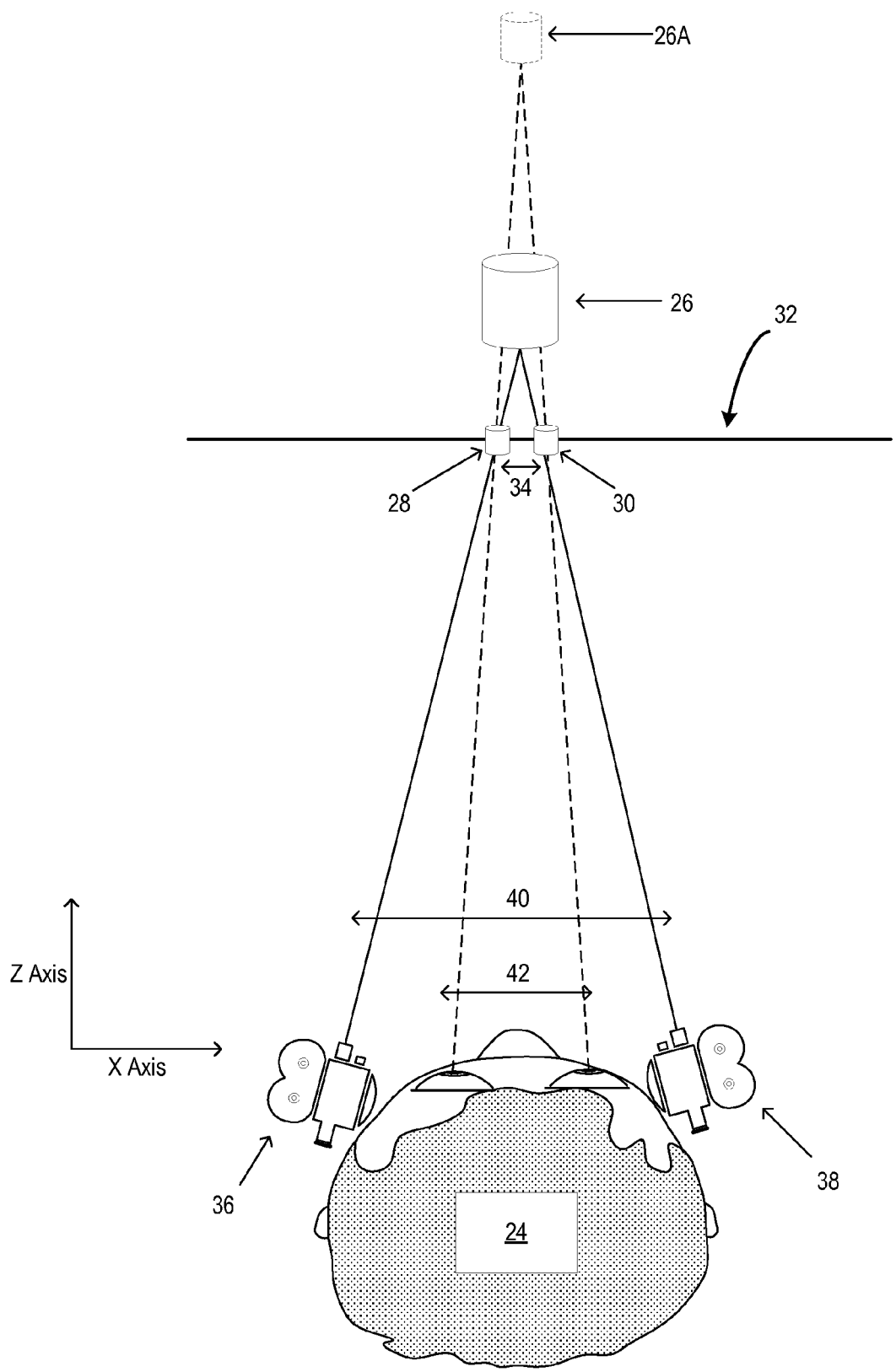
FIG. 2 shows a world-locked virtual object rendered with an incorrect inter-pupillary distance.

Now turning to FIG. 2, in order to display virtual object 26 at the illustrated depth and location using stereoscopy, the HMD device 10 displays the left image 28 to the left eye of the user 24, and display the right image 30 to the right eye of the user 24. The left image 28 and the right image 30 are rendered at the rendering focal plane 32 of the HMD device 10. As illustrated in FIG. 2, the left image 28 and the right image 30 are rendered with a horizontal disparity 34 between their relative positions in the two images.

The left image 28 and the right image 30 are rendered by the HMD device 10 from the perspective of the left virtual camera 36 and the right virtual camera 38. It will be appreciated that the left virtual camera 36 and the right virtual camera 38 visually represent view matrices in the software of the HMD device 10. The view matrices are used to project the virtual world of the HMD device 10 onto a specific perspective. That is, the view matrix represented by the left virtual camera 36 is used by the HMD device 10 to model what the left eye of the user would see when looking at the virtual world from the location and orientation of the left virtual camera 36. Similarly, the view matrix represented by the right virtual camera 38 is used by the HMD device 10 to model what the right eye of the user would see when looking at the virtual world from the location and orientation of the right virtual camera 38.

As illustrated in FIG. 2, the relative positions of the left virtual camera 36 and the right virtual camera 38 are separated by a distance 40 from each other in the x axis. This distance 40 represents an initial preset IPD of the HMD device 10. However, it will be appreciated that the initial preset IPD represented by the distance 40 may be different than the user's actual IPD 42 as shown in FIG. 2. Consequently, when viewing the left image 28 and the right image 30, the user will not actually perceive that the virtual object 26 is located at its desired depth. Instead, the user will perceive that the virtual object 26 exists at the depth and location illustrated by the perceived virtual object 26A.

Figure 3:
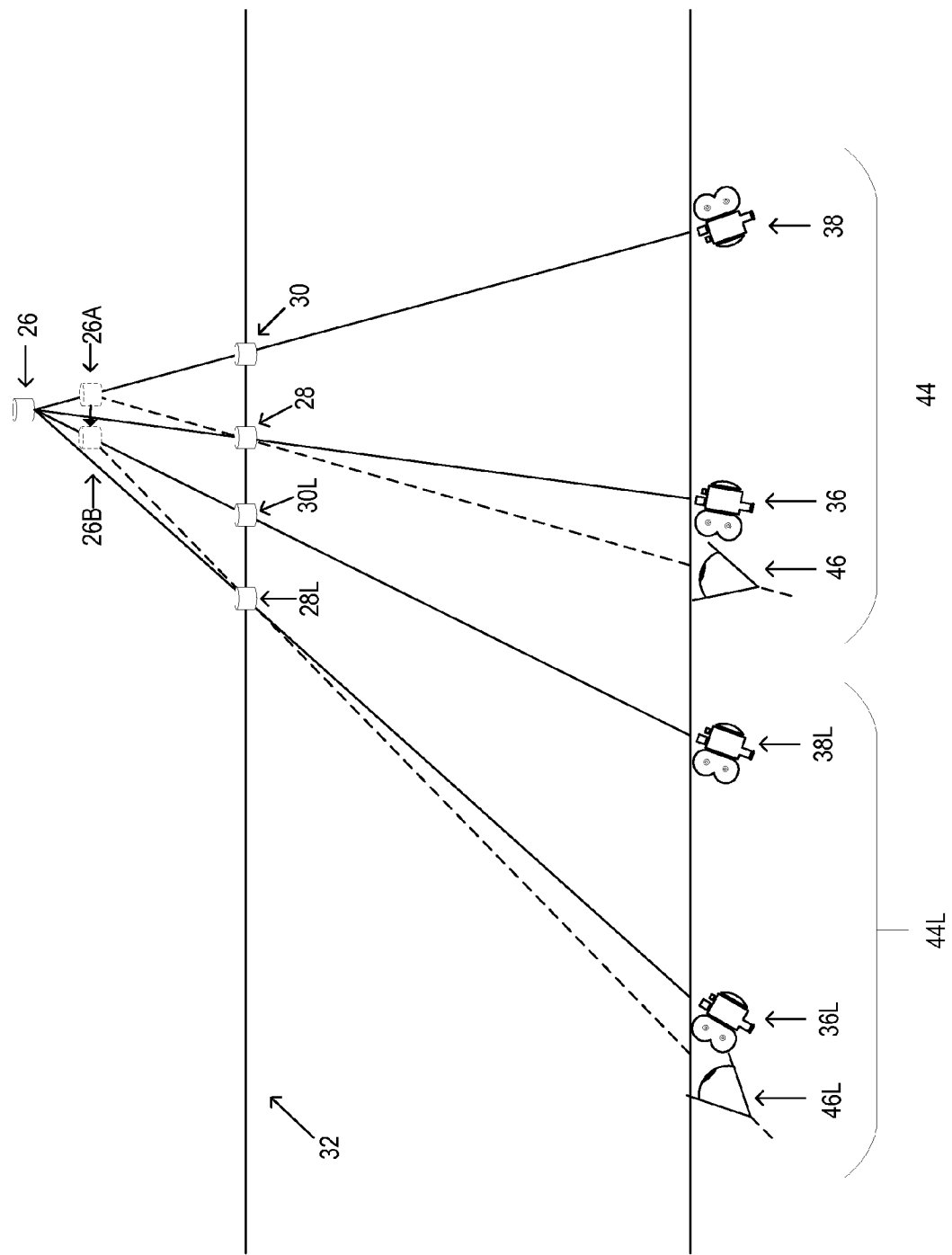
FIG. 3 shows a world-locked object rendered from two locations with an incorrect inter-pupillary distance.

Now turning to FIG. 3, the virtual object 26 is world-locked at its current depth and location in the virtual world. If the user is viewing the virtual object 26 from the location and orientation of the illustrated eye system 44, then the HMD device 10 renders two images of the virtual object 26, left image 28 and right image 30, at the rendering plane 32 from the perspective of the left camera 36 and the right camera 38. In this example, the user's IPD was larger than expected, and the user's left eye 46 is farther to the left than the location of the left camera 36. Consequently, when viewing the left image 28 and the right image 30, the user will perceive that the virtual object 26 is located at the position of perceived virtual object 26A.

If the user moves to the left and views the virtual object 26 from the location and orientation of the illustrated eye system 44L, then the HMD device 10 renders two images of the virtual object 26, shifted left image 28L and shifted right image 30L, at the rendering plane 32 from the perspective of the shifted left camera 36L and the shifted right camera 38L. In this example, the eye system 44L is the same eye system as eye system 44, but shifted a distance to the left. It will be appreciated that virtual object 26 is world-locked, and has not moved respective to the virtual world of the HMD device 10. However, when viewing the shifted left image 28L and the shifted right image 30L, the user will perceive that the virtual object 26 is located at the position of the perceived virtual object 26B. As illustrated in FIG. 3, perceived virtual object 26B will appear to be shifted to the left of perceived virtual object 26A. Consequently, as the user moves to the left, and the user's eyes move from the perspectives of eye system 44 to eye system 44L, the user will perceive that the virtual object 26 is moving, in particular from the location of 26A to the location of 26B. It will be appreciated that the human eye is acutely sensitive to motion. Even small discrepancies between the initial preset IPD of the HMD device 10 and the user's actual IPD, will cause a moving user to perceive that an object which is supposed to be world-locked such as virtual object 26, is also moving, which generally degrades the user experience.

Figure 4:
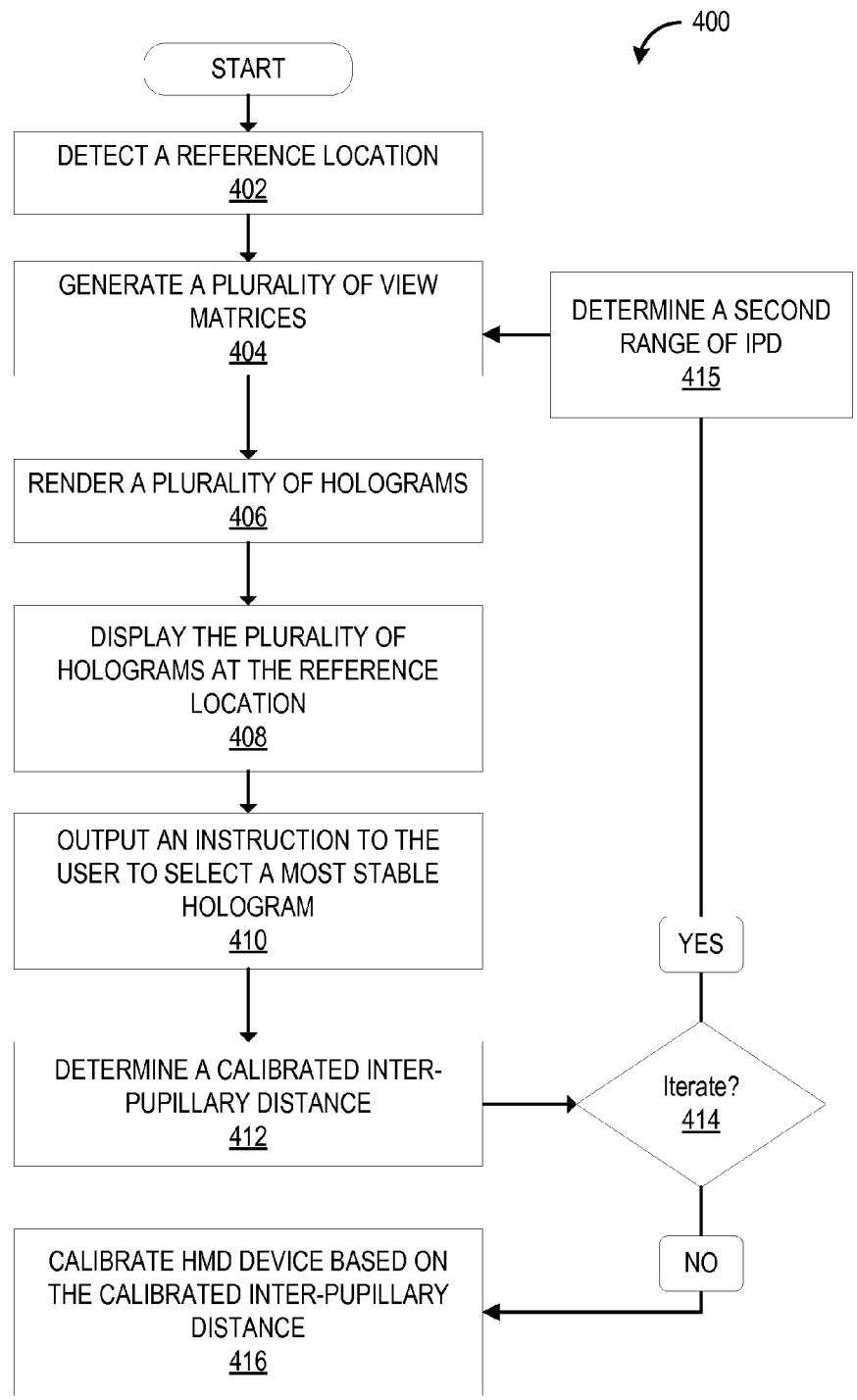
FIG. 4 shows a method of calibrating a head-mounted display for inter-pupillary distance according to an embodiment of the present description.

FIG. 4 shows an example method 400 of detecting a user's IPD and calibrating an HMD device according to an embodiment of the present description. At step 402, the method 400 may include detecting a reference location. In one example, the reference location is detected by the optical sensor system 14 of the HMD device 10, which may include the outward facing optical sensor 16 and a depth camera. In this embodiment, it may be advantageous to only detect reference locations that are at least a threshold distance away from a rendering focal plane of the HMD device 10. In one example, the threshold distance may be 10% to 40% of the distance from the HMD device 10 to the rendering focal plane. However, it will be appreciated that other threshold distances are possible, such as 25%-35% of the distance from the HMD device 10 to the rendering focal plane. Additionally, the reference location may be a physical marker having an identifiable characteristic known to the HMD device 10. Optionally, the reference location may be a physical surface in the real world viewed by the HMD device 10, such as a two dimensional planar surface of a poster or other objects such as a flat wall, a table top, or a shelf. In another embodiment, the reference location may be a point in the air determined by the HMD device 10. In this example, the HMD device 10 may select a point in the air that is a suitable threshold distance away from the rendering focal plane. Additionally, the HMD device 10 may use visual information detected by the optical sensor system 14 to calculate the location of the point in the air relative to other physical objects being viewed by the HMD device 10.

Proceeding from step 402 to step 404, the method 400 may include generating a first plurality of view matrices. In one example, each view matrix is generated corresponding to a different inter-pupillary distance within a first range of inter-pupillary distance. In this example, the view matrices may be configured to correspond to an even distribution of inter-pupillary distances across the first range of inter-pupillary distances.

Advancing from step 404 to step 406, the method 400 may include rendering a first plurality of holograms. In one example, each hologram is rendered using a different view matrix from the first plurality of view matrices generated in step 404. Additionally, the plurality of holograms may be rendered as static 3D images, such as a can, a cube, or virtually any other static 3D object. Optionally, the plurality of holograms may be rendered as dynamic 3D images, such as a car with rotating wheels as one specific example. In addition to rendering either static or 3D images, the plurality of holograms may be rendered having the same uniform color. Additionally or optionally, the plurality of holograms may be further rendered having the same apparent size.

Proceeding from step 406 to step 408, the method 400 may include displaying the first plurality of holograms at the reference location detected in step 402. In one example, two images of the rendered first plurality of holograms are displayed, one image for each eye of the user looking through the at least partially see-through stereoscopic display 12. Additionally or optionally, the first plurality of holograms may be rendered alongside each other in a single row or column at the reference location.

Advancing from step 408 to step 410, the method 400 may include outputting an instruction to the user to select a most stable hologram from among the first plurality of holograms. In one example, the HMD device 10 outputs an instruction to the user of the HMD device 10 to move the user's head while viewing the first plurality of holograms and to select a hologram from among the first plurality of holograms with a most stable appearance. In this example, the hologram with the most stable appearance is the hologram that appears to the user to move the least while the user is moving the user's head. It will be appreciated that the instruction may be outputted to the user through virtually any communication medium, such as through sounds or visuals displayed on the at least partially see-through stereoscopic display 12. Additionally, the user may input a selection through virtually any communication medium, such as through voice-activated input detected by a microphone of the HMD, a keyboard coupled by wired or wireless link to the HMD, or hand gestures detected by a depth camera of the HMD. Following output of the instruction, the method may further include receiving a user selection indicating a hologram from among the first plurality of holograms with a most stable appearance when the user's head is moving. It will be appreciated that the instruction to the user to move the user's head may include many types of user movements that translate the user's head relative to the plurality of holograms. In one example, the user may move the user's head relative to the plurality of holograms while simultaneously standing still. In another example, the user may walk around the plurality of holograms while simultaneously viewing the plurality of holograms. User movements that result in a larger translation of the user's head relative to the plurality of holograms will allow the user to perceive motion in holograms rendered with a smaller IPD error.

Proceeding from step 410 to step 412, the method 400 may include determining a calibrated inter-pupillary distance. In one example, the calibrated inter-pupillary distance is determined based on the view matrix of the hologram selected by the user in step 410. In this example, the view matrix of the selected hologram has a corresponding inter-pupillary distance, which will be set as the calibrated inter-pupillary distance for the HMD device 10.

After step 412, the method 400 may either advance directly to step 416 or perform an additional iteration of steps 404-412. In an iterative example, the method 400 proceeds from step 412 to step 415 and includes determining a second range of inter-pupillary distances. In one example, the second range of inter-pupillary distances is determined based on the calibrated inter-pupillary distance that was determined in step 412. More specifically, the second range of inter-pupillary distances may be a smaller range than the first range of inter-pupillary distances used in the first iteration. Additionally or optionally, the second range of inter-pupillary distances may be determined such that the median value of the second range of inter-pupillary distance is the calibrated inter-pupillary distance determined in step 412.

In the second iteration, the method 400 may advance from step 415 back to step 404 and may include generating a second plurality of view matrices. In this example, each view matrix of the second plurality of view matrices corresponds to a different inter-pupillary distance within the second range of inter-pupillary distances determined in step 415.

Continuing the second iteration, the method 400 may advance from step 404 to step 406 and may include rendering a second plurality of holograms. In this example, each hologram is rendered using a different view matrix from the second plurality of view matrices generated in step 404.

Advancing the second iteration, the method 400 may proceed from step 406 to step 408 and may include displaying the second plurality of holograms. In this example, the second plurality of holograms are displayed on the at least partially see-through stereoscopic display 12 at the same reference location that was detected in step 402. The second plurality of holograms may be rendered similarly to the first plurality of holograms.

Continuing the second iteration, the method 400 may advance from step 408 to step 410 and includes outputting a second instruction to the user to select a most stable hologram. In this example, the HMD device 10 outputs the second instruction for the user of the HMD device 10 to move the user's head while viewing the second plurality of holograms and to select a second hologram from among the second plurality of holograms with a most stable appearance.

Advancing the second iteration, the method 400 may proceed from step 410 to step 412 and may include determining the calibrated inter-pupillary distance. In one example, the HMD device 10 recalculates the calibrated inter-pupillary distance based on the view matrix of the selected second hologram. The inter-pupillary distance corresponding to this view matrix may be more accurate than the view matrix for the first selected hologram, as a smaller range of inter-pupillary distances were used when rendering the second plurality of holograms.

It will be appreciated that steps 404-412 may be iterated multiple times, successively decreasing the range of inter-pupillary distances used to generate the view matrices for rendering the plurality of holograms. With each successive iteration, the determined calibrated inter-pupillary distance may get closer to the user's actual inter-pupillary distance.

When the last iteration has been completed, method 400 proceeds from step 412 to step 416 and includes calibrating the HMD device 10 based on the calibrated inter-pupillary distance. Calibrating the HMD device 10 may include saving the calibrated inter-pupillary distance determined in step 412 to a profile stored on the HMD device 10. Additionally or optionally, the calibrated inter-pupillary distance may be stored on a computing device or a server device that is in communication with the HMD device 10. The saved calibrated inter-pupillary distance may then be used when rendering visuals for any application on the HMD device 10.

Figure 5:
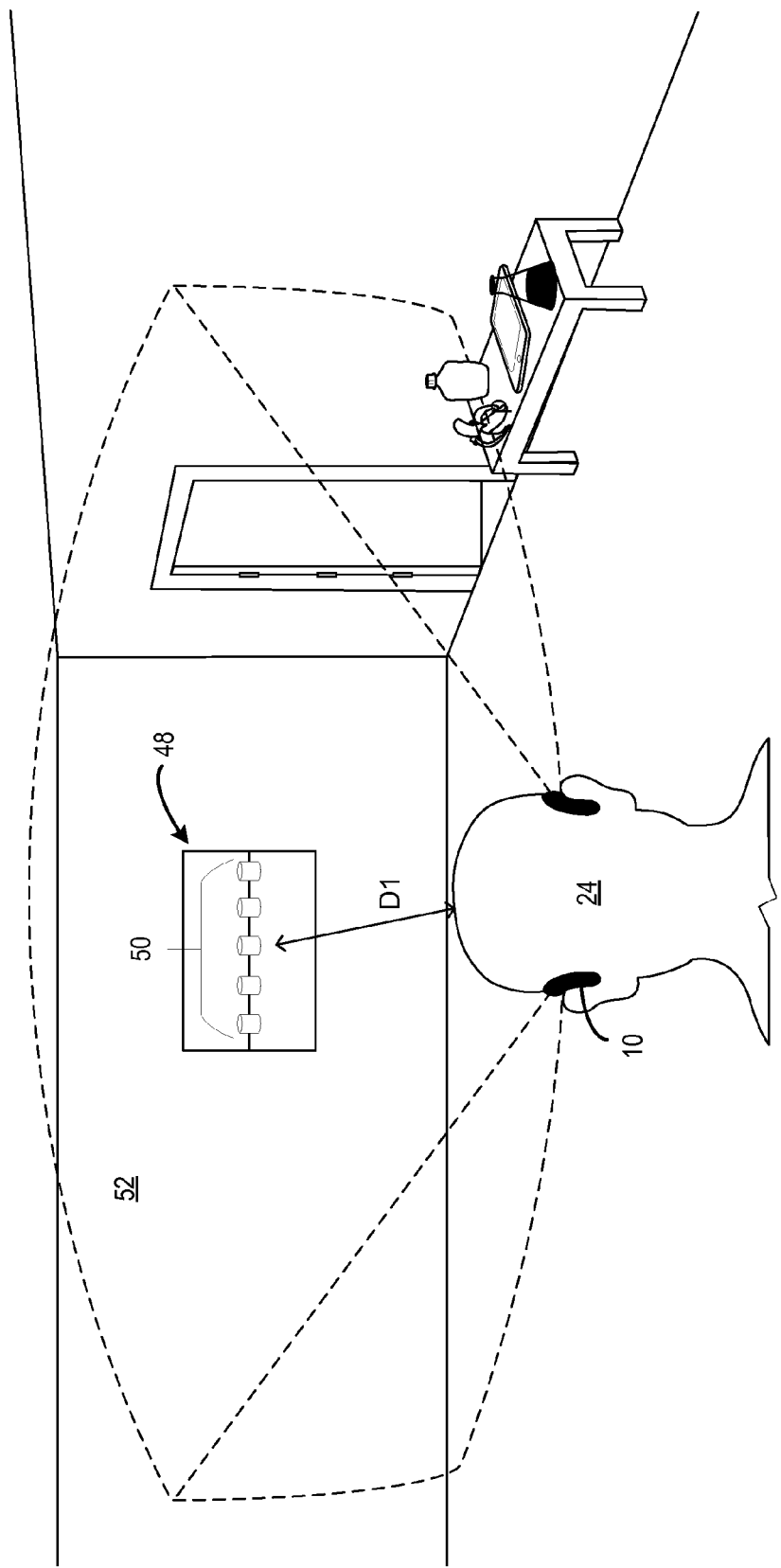
FIG. 5 shows a plurality of holograms rendered at a reference location according to an embodiment of the present description.

Now turning to FIG. 5, the reference location 48 is illustrated as existing on the wall 52, which is a physical surface in the real world. In one embodiment, the reference location 48 is a physical poster having a two dimensional planar surface, which may be printed out by the user or packaged with the HMD device 10. The poster may be a physical marker having an identifiable characteristic known to the head mounted display device. For example, the poster may have a known height and width stored in the memory of the HMD device 10. Additional identifiable characteristics may include unique markings and symbols, or virtually any type of marking identifiable by the optical sensor system 14 of the HMD device 10. Additionally or optionally, the poster may include a horizontal or vertical line that may be used by the HMD device 10 to position the plurality of holograms.

In a second embodiment, the reference location may be a physical surface viewed by the HMD device 10. In the example illustrated in FIG. 5, the physical surface is the wall 52, which is recognized by the optical sensor system 14 of the HMD device 10. In particular, depth cameras of the optical sensor system 14 may recognize that the wall 52 is a flat surface that may be utilized as a reference location. It will be appreciated that the physical surface in this embodiment is not limited to walls, and may take other forms of substantially flat surfaces, such as a table top, a shelf, or a floor.

Upon detecting a reference location, depth cameras of the optical sensor system may calculate the distance D1 between the reference location 48 and the user 24. Additionally, the HMD device 10 may render a plurality of holograms 50 at the reference location 48 according to step 406 of the method 400.

Figure 6:
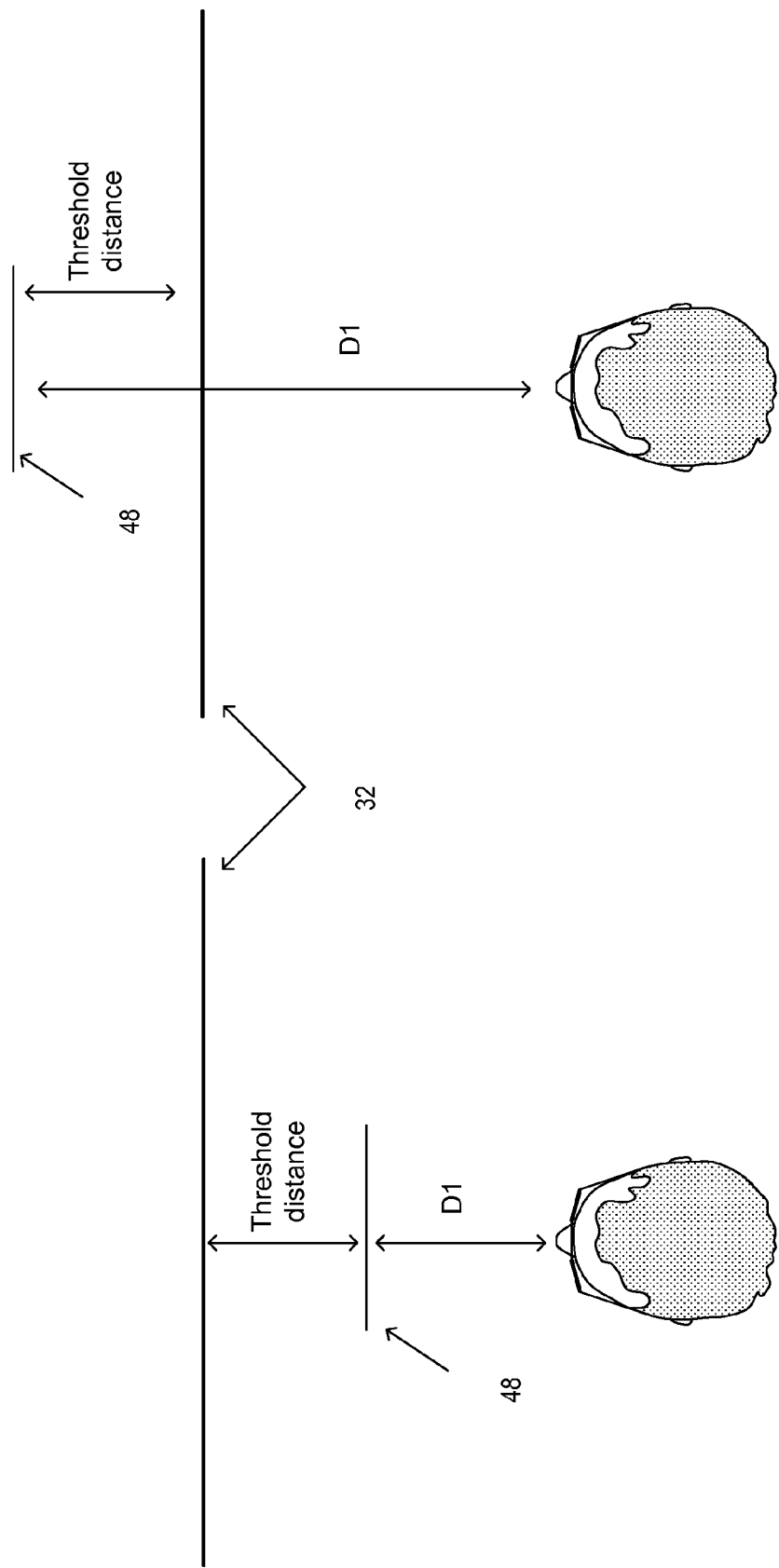
FIG. 6A shows a reference location that is a threshold distance in front of a rendering focal plane of the head-mounted display according to an embodiment of the present description.
FIG. 6B shows a reference location that is a threshold distance behind a rendering focal plane of the head-mounted display according to an embodiment of the present description

Now turning to FIG. 6A, the reference location detected by the HMD device 10 should be at least a threshold distance away from the rendering focal plane 32 of the HMD device 10. The rendering focal plane 32 is a set characteristic of the HMD device 10, and in one example, may be 1-2 meters away from the HMD device 10. In another example, the rendering focal plane 32 may be set to be less than 1 meter away from the HMD device 10, or any distance up to and including infinity depending upon the design of the HMD device 10. It will be appreciated that the rendering focal plane may be set to virtually any distance without departing from the scope of this application.

It will be further appreciated that if the reference location was substantially coplanar with the rendering focal plane, then the plurality of holograms would be rendered at or substantially near the rendering focal plane. Consequently, as the holograms are rendered at the focal plane, the holograms will appear world-locked as the user moves the user's head, even if the inter-pupillary distances used to render the holograms were incorrect. Thus, all of the holograms would appear equally stable, and the inter-pupillary distance would not be accurately determined.

Accordingly, as illustrated in FIG. 6A and FIG. 6B, the reference location 48 should be located at least a threshold distance away from the rendering focal plane 32. In one specific example, if the rendering focal plane is 2 meters from the HMD device 10, then the threshold distance may be 1.7 meters, and distance D1 that is the distance between the reference location and the user may be 30 centimeters. It will be appreciated that a large variety of threshold distance are possible without departing from the scope of this application. As other examples, the threshold distance may be set to be between 10% and 40%, between 25% and 35% and most specifically substantially 30%, of the distance from the HMD device 10 to the rendering focal plane 32. In general, a larger threshold distance, and therefore a larger distance between the reference location and the rendering focal plane, will result in more easily perceptible hologram movements, and may improve the user's accuracy in distinguishing the stable hologram from the moving holograms during method 400. However, larger threshold distances may also result in increased user discomfort when viewing the holograms. Accordingly, the threshold distance may be determined based on a desired tradeoff between more obvious movements of the holograms and user comfort.

FIG. 6A illustrates an example where the reference location 48 is in front of the rendering focal plane 32. However, FIG. 6B illustrates a second example where the reference location 48 is farther away from the user than the rendering focal plane 32. In either example, the reference location 48 should be at least a threshold distance away from the rendering focal plane 32, such that the perceived motion detailed in FIG. 3 will occur as the user of the HMD device 10 moves while viewing holograms rendered with an incorrect inter-pupillary distance. If the reference location is not located at least a threshold distance away from the rendering focal plane, the HMD device 10 may output an instruction to the user to move either closer or farther away from the reference location. This instruction may be a visual rendered on the at least partially see-through stereoscopic display 12, an auditory output, or virtually any other medium well known in the art for communicating to the user.

Figure 7:
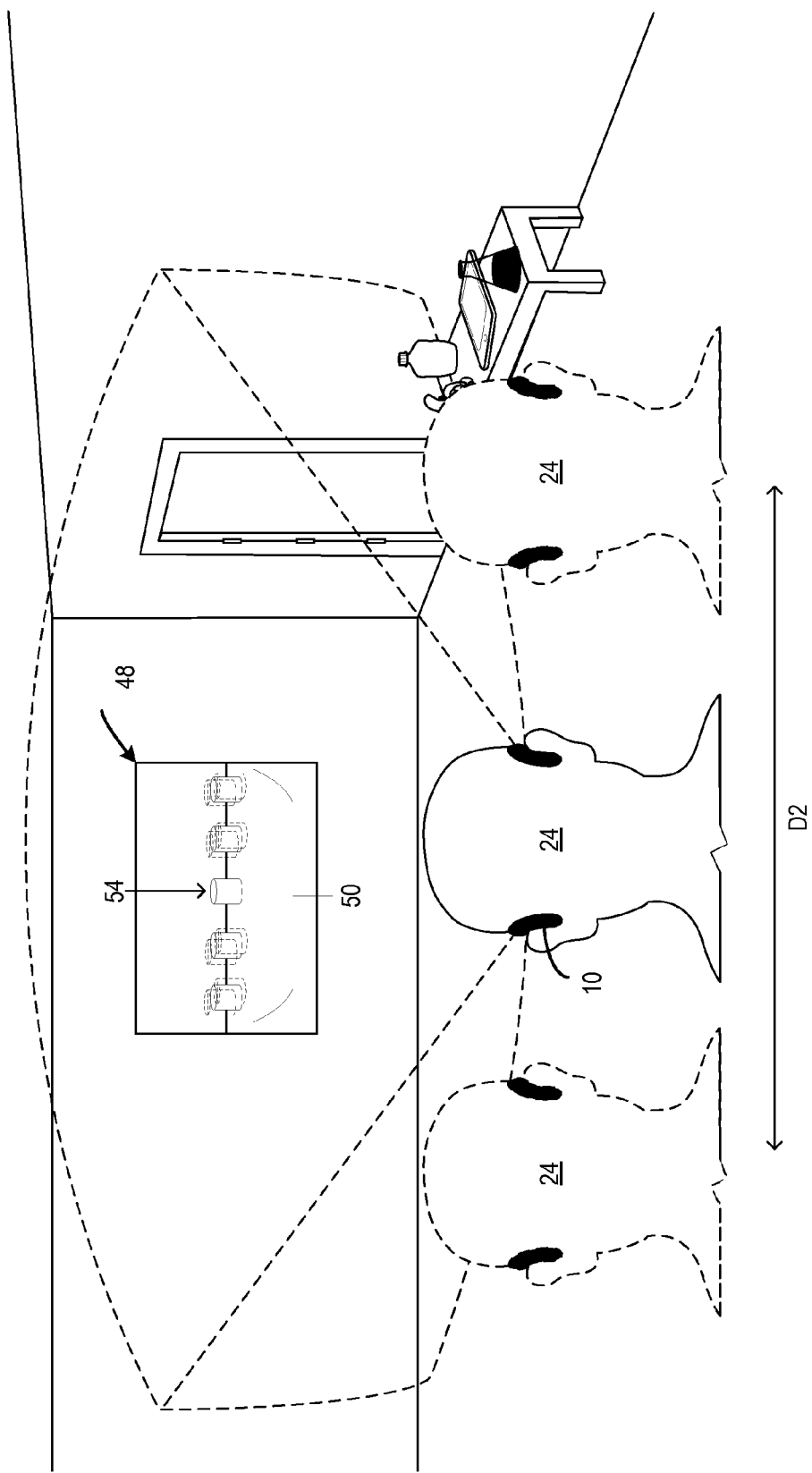
FIG. 7 shows a plurality of unstable holograms rendered at a reference location according to an embodiment of the present description.

Now turning to FIG. 7, several holograms of the plurality of holograms 50 will appear to be in motion to the user 24 that is moving back and forth in the direction D2. While FIG. 7 illustrates that the user 24 moving to the left and right in the direction D2, it will be appreciated that many different user movements will result in the user perceiving that several holograms of the plurality of holograms 50 are moving. The degree of perceived motion of the plurality of holograms 50 will depend upon the disparity between the inter-pupillary distance used to render a hologram and the user's actual inter-pupillary distance. Accordingly, one or more of the holograms will appear to have a more stable appearance than the other holograms. More specifically, the hologram rendered using a view matrix with an inter-pupillary distance that is closest to the user's actual inter-pupillary distance will appear to be the most stable hologram. In the example illustrated in FIG. 7, the most stable hologram 54 is the center hologram of the plurality of holograms 50. However, it will be appreciated that the most stable hologram will not necessarily be in the center. Additionally, it will be appreciated that while five holograms are illustrated in FIG. 7, virtually any number of holograms may be rendered without departing from the scope of this application.

Figure 8:
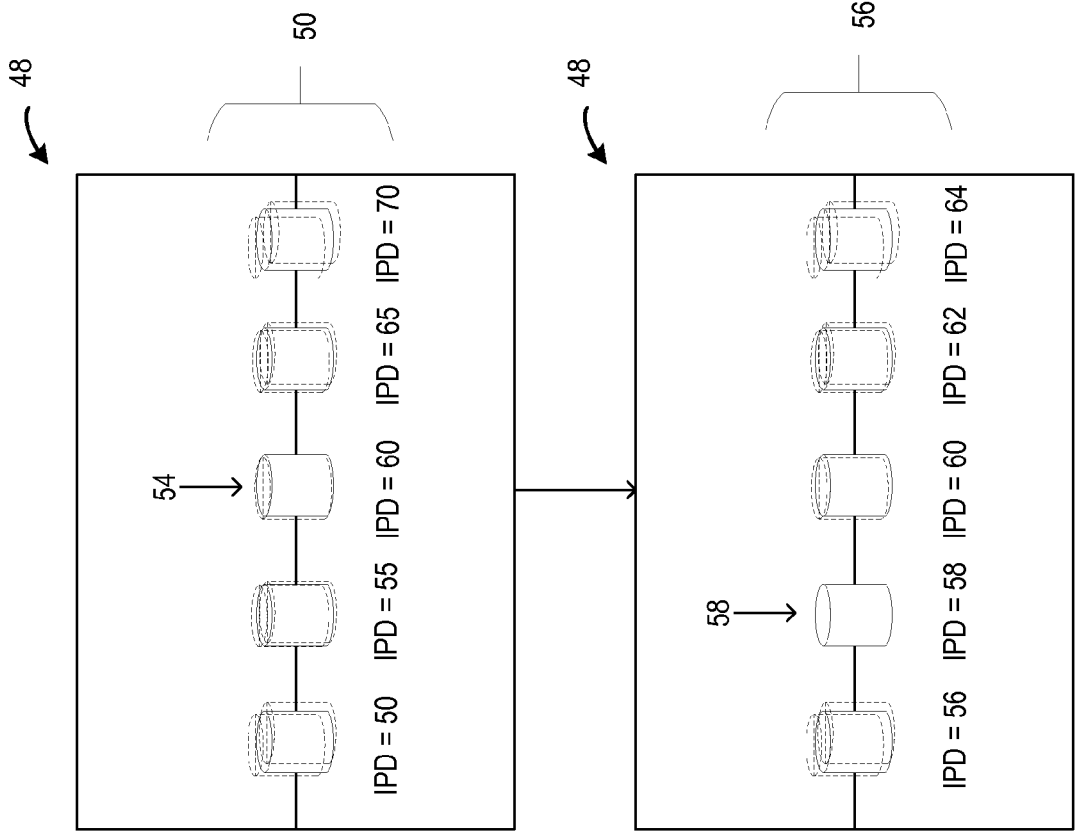
FIG. 8A shows a plurality of unstable holograms rendered with a range of inter-pupillary distances.
FIG. 8B shows a plurality of unstable holograms rendered with a smaller range of inter-pupillary distance.

FIG. 8A illustrates the plurality of holograms 50 that are rendered at the reference location 48. In this example, the inter-pupillary distances of the view matrices used to render the plurality of holograms 50 are within the range of inter-pupillary distances from 50 mm to 70 mm. It will be appreciated that the range of inter-pupillary distances may be smaller or larger than the range illustrated in FIG. 8A. For example, the range of inter-pupillary distances may be from 50 mm to 80 mm, or virtually any other reasonable range of inter-pupillary distances.

FIG. 8B illustrates an example of a second iteration of method 400. In the first iteration, the user selected a most stable hologram 54. In the example illustrated in FIG. 8A and FIG. 8B, the selected most stable hologram 54 was rendered with a view matrix having an inter-pupillary distance of 60 mm. However, as illustrated in FIG. 8A, the selected hologram 54 was not completely stable. Accordingly, the method 400 proceeds to a second iteration, and the HMD device 10 renders a second plurality of holograms 56 at the reference location. The second plurality of holograms 56 are rendered with view matrices having different inter-pupillary distances within a second range of inter-pupillary distance. As illustrated in FIG. 8B, the second range of inter-pupillary distances ranges from 56 mm to 64 mm. This second range of inter-pupillary distances is smaller than the first range of inter-pupillary distances used to render the first plurality of holograms 50 in FIG. 8A. Additionally, the second range of inter-pupillary distances is centered at the inter-pupillary distance of the first selected most stable hologram 54. Accordingly, the second range of inter-pupillary distance is finer than the first range of inter-pupillary distances. The finer gradient of the second range of inter-pupillary distance increases the likelihood that one of the holograms will be rendered with an inter-pupillary distance that is the same or substantially the same as the user's actual inter-pupillary distance. As illustrated in FIG. 8B, the hologram corresponding to an inter-pupillary distance of 58 mm is the second selected most stable hologram 58, and will be used to calibrate the inter-pupillary distance of the HMD device 10. It will be appreciated that multiple methods may be used to produce a finer gradient in each successive iteration of method 400 without departing from the scope of this application. For example, rather than decreasing the range of the inter-pupillary distances, the number of holograms may be increased such that there are a greater number of inter-pupillary distances represented within the same range of inter-pupillary distances compared to the previous iteration of method 400.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
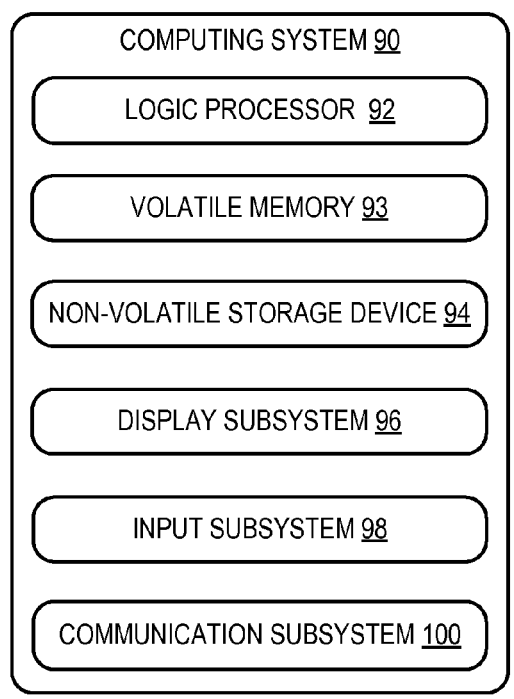
FIG. 9 shows a computing system according to an embodiment of the present description.

FIG. 9 schematically shows a non-limiting embodiment of a computing system 90 that can enact one or more of the methods and processes described above. Computing system 90 is shown in simplified form. Computing system 90 may take the form of one or more head-mounted display devices as shown in FIG. 1, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 90 includes a logic processor 92 volatile memory 93, and a non-volatile storage device 94. Computing system 90 may optionally include a display subsystem 96, input subsystem 98, communication subsystem 100, and/or other components not shown in FIG. 9.

Logic processor 92 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 92 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 94 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 94 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 94 may include nonvolatile, dynamic, static, read/write, read-only, sequential-access, location-addressable, file-addressable, and/or content-addressable devices. It will be appreciated that non-volatile storage device 94 is configured to hold instructions even when power is cut to the non-volatile storage device 94.

Volatile memory 93 may include physical devices that include random access memory. Volatile memory 93 is typically utilized by logic processor 92 to temporarily store information during processing of software instructions. It will be appreciated that volatile memory 93 typically does not continue to store instructions when power is cut to the volatile memory 93.

Aspects of logic processor 92, volatile memory 93, and non-volatile storage device 94 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 90 implemented to perform a particular function. In some cases, a module, program, or engine may be instantiated via logic processor 92 executing instructions held by non-volatile storage device 94, using portions of volatile memory 93. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 96 may be used to present a visual representation of data held by non-volatile storage device 94. This visual representation may take the form of a graphical user interface (GUI). As the herein described methods and processes change the data held by the non-volatile storage device, and thus transform the state of the non-volatile storage device, the state of display subsystem 96 may likewise be transformed to visually represent changes in the underlying data. Display subsystem 96 may include one or more display devices utilizing virtually any type of technology. Such display devices may be combined with logic processor 92, volatile memory 93, and/or non-volatile storage device 94 in a shared enclosure, or such display devices may be peripheral display devices. The at least partially see-through display of HMD 10 described above is one example of a display subsystem 96.

When included, input subsystem 98 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to position sensor system 18 of FIG. 1; and/or any other suitable sensor.

When included, communication subsystem 100 may be configured to communicatively couple computing system 90 with one or more other computing devices. Communication subsystem 100 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 90 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The following paragraphs provide additional support for the claims of the subject application. One aspect provides a head mounted display device for motion based view matrix tuning, comprising a display, a processor, and a non-volatile storage device holding instructions executable by the processor to: detect a reference location that is at least a threshold distance away from a rendering focal plane of the head mounted display device, generate a first plurality of view matrices, each view matrix corresponding to a different inter-pupillary distance within a first range of inter-pupillary distances, render a first plurality of holograms, each hologram rendered using a different view matrix from the first plurality of view matrices, display the first plurality of holograms on the display at the reference location, output a first instruction to a user of the head mounted display device to move the user's head while viewing the first plurality of holograms and to select a hologram from among the first plurality of holograms with a most stable appearance, determine a calibrated inter-pupillary distance based on the view matrix of the selected hologram, and calibrate the head mounted display device based on the calibrated inter-pupillary distance. The head mounted display device may additionally or alternatively include, wherein the threshold distance is between 10% and 40% of a distance from the head mounted display device to the rendering focal plane. The head mounted display device may additionally or alternatively include, wherein the threshold distance is between 25% and 35% of a distance from the head mounted display device to the rendering focal plane. The head mounted display device may additionally or alternatively include, wherein the reference location is a physical marker having an identifiable characteristic known to the head mounted display device. The head mounted display device may additionally or alternatively include, wherein the reference location is a physical surface viewed by the head mounted display device. The head mounted display device may additionally or alternatively include, wherein the first plurality of holograms are static 3D images. The head mounted display device may additionally or alternatively include, wherein the first plurality of holograms are rendered with the same color. The head mounted display device may additionally or alternatively include, wherein the first plurality of holograms are dynamic 3D images. The head mounted display device may additionally or alternatively include, wherein the non-volatile storage device holds further instructions to: determine a second range of inter-pupillary distances based on the calibrated inter-pupillary distance, generate a second plurality of view matrices, each view matrix corresponding to a different inter-pupillary distance within the second range of inter-pupillary distances, render a second plurality of holograms, each hologram rendered using a different view matrix from the second plurality of view matrices, display the second plurality of holograms on the display at the reference location, output a second instruction to the user of the head mounted display device to move the user's head while viewing the second plurality of holograms and to select a second hologram from among the second plurality of holograms with a most stable appearance, and recalculate the calibrated inter-pupillary distance based on the view matrix of the selected second hologram. The head mounted display device may additionally or alternatively include, wherein the second range of inter-pupillary distances is a smaller range than the first range of inter-pupillary distance.

Another aspect provides a method for motion based view matrix tuning for a head mounted display device, the method comprising, detecting a reference location that is at least a threshold distance away from a rendering focal plane of the head mounted display device, generating a first plurality of view matrices, each view matrix corresponding to a different inter-pupillary distance within a first range of inter-pupillary distances, rendering a first plurality of holograms, each hologram rendered using a different view matrix from the first plurality of view matrices, displaying the first plurality of holograms on the display at the reference location, outputting a first instruction to a user of the head mounted display device to move the user's head while viewing the first plurality of holograms and to select a hologram from among the first plurality of holograms with a most stable appearance, determining a calibrated inter-pupillary distance based on the view matrix of the selected hologram, and calibrating the head mounted display device based on the calibrated inter-pupillary distance. The method may additionally or optionally include, wherein the threshold distance is between 10% and 40% of a distance from the head mounted display device to the rendering focal plane. The method may additionally or optionally include, wherein the reference location is a physical marker having an identifiable characteristic known to the head mounted display device. The method may additionally or optionally include, wherein the reference location is a physical surface viewed by the head mounted display device. The method may additionally or optionally include, wherein the first plurality of holograms are static 3D images. The method may additionally or optionally include, wherein the first plurality of holograms are rendered with the same color. The method may additionally or optionally include, wherein the first plurality of holograms are dynamic 3D images. The method may additionally or optionally include, determining a second range of inter-pupillary distances based on the calibrated inter-pupillary distance, generating a second plurality of view matrices, each view matrix corresponding to a different inter-pupillary distance within the second range of inter-pupillary distances, rendering a second plurality of holograms, each hologram rendered using a different view matrix from the second plurality of view matrices, displaying the second plurality of holograms on the display at the reference location, outputting a second instruction to the user of the head mounted display device to move the user's head while viewing the second plurality of holograms and to select a second hologram from among the second plurality of holograms with a most stable appearance, and recalculating the calibrated inter-pupillary distance based on the view matrix of the selected second hologram. The method may additionally or optionally include, wherein the second range of inter-pupillary distances is a smaller range than the first range of inter-pupillary distances.

Another aspect provides a head mounted display device for motion based view matrix tuning comprising, an at least partially see-through display, a processor, and a non-volatile storage device holding instructions executable by the processor to: generate a first plurality of view matrices, each view matrix corresponding to a different inter-pupillary distance within a first range of inter-pupillary distances, render a first plurality of holograms, each hologram rendered using a different view matrix from the first plurality of view matrices, display the first plurality of holograms on the display at a reference location that is at least a threshold distance away from a rendering focal plane of the head mounted display device, receive a user selection indicating a hologram from among the first plurality of holograms with a stable appearance when the user's head is moving, determine a calibrated inter-pupillary distance based on the view matrix of the selected hologram, and calibrate the head mounted display device based on the calibrated inter-pupillary distance.

The invention claimed is:

1. A head mounted display device for motion based view matrix tuning comprising:
   a display;
   a processor;
   a non-volatile storage device holding instructions executable by the processor to:
      detect a reference location that is at least a threshold distance away from a rendering focal plane of the head mounted display device;
      generate a first plurality of view matrices, each view matrix corresponding to a different inter-pupillary distance within a first range of inter-pupillary distances;
      render a first plurality of holograms, each hologram rendered using a different view matrix from the first plurality of view matrices;
      display the first plurality of holograms on the display at the reference location;
      output a first instruction to a user of the head mounted display device to move the user's head while viewing the first plurality of holograms and to select a hologram from among the first plurality of holograms with a most stable appearance;
      determine a calibrated inter-pupillary distance based on the view matrix of the selected hologram; and
      calibrate the head mounted display device based on the calibrated inter-pupillary distance.

2. The head mounted display device of claim 1, wherein the threshold distance is between 10% and 40% of a distance from the head mounted display device to the rendering focal plane.

3. The head mounted display device of claim 1, wherein the threshold distance is between 25% and 35% of a distance from the head mounted display device to the rendering focal plane.

4. The head mounted display device of claim 1, wherein the reference location is a physical marker having an identifiable characteristic known to the head mounted display device.

5. The head mounted display device of claim 1, wherein the reference location is a physical surface viewed by the head mounted display device.

6. The head mounted display device of claim 1, wherein the first plurality of holograms are static 3D images.

7. The head mounted display device of claim 6, wherein the first plurality of holograms are rendered with the same color.

8. The head mounted display device of claim 1, wherein the first plurality of holograms are dynamic 3D images.

9. The head mounted display device of claim 1, wherein the non-volatile storage device holds further instructions to:
   determine a second range of inter-pupillary distances based on the calibrated inter-pupillary distance;
   generate a second plurality of view matrices, each view matrix corresponding to a different inter-pupillary distance within the second range of inter-pupillary distances;
   render a second plurality of holograms, each hologram rendered using a different view matrix from the second plurality of view matrices;
   display the second plurality of holograms on the display at the reference location;
   output a second instruction to the user of the head mounted display device to move the user's head while viewing the second plurality of holograms and to select a second hologram from among the second plurality of holograms with a most stable appearance; and
   recalculate the calibrated inter-pupillary distance based on the view matrix of the selected second hologram.

10. The head mounted display device of claim 9, wherein the second range of inter-pupillary distances is a smaller range than the first range of inter-pupillary distances.

11. A method for motion based view matrix tuning for a head mounted display device, the method comprising:
   detecting a reference location that is at least a threshold distance away from a rendering focal plane of the head mounted display device;
   generating a first plurality of view matrices, each view matrix corresponding to a different inter-pupillary distance within a first range of inter-pupillary distances;
   rendering a first plurality of holograms, each hologram rendered using a different view matrix from the first plurality of view matrices;
   displaying the first plurality of holograms on the display at the reference location;
   outputting a first instruction to a user of the head mounted display device to move the user's head while viewing the first plurality of holograms and to select a hologram from among the first plurality of holograms with a most stable appearance;
   determining a calibrated inter-pupillary distance based on the view matrix of the selected hologram; and
   calibrating the head mounted display device based on the calibrated inter-pupillary distance.

12. The method of claim 11, wherein the threshold distance is between 10% and 40% of a distance from the head mounted display device to the rendering focal plane.

13. The method of claim 11, wherein the reference location is a physical marker having an identifiable characteristic known to the head mounted display device.

14. The method of claim 11, wherein the reference location is a physical surface viewed by the head mounted display device.

15. The method of claim 11, wherein the first plurality of holograms are static 3D images.

16. The method of claim 15, wherein the first plurality of holograms are rendered with the same color.

17. The method of claim 11, wherein the first plurality of holograms are dynamic 3D images.

18. The method of claim 11, further comprising:
   determining a second range of inter-pupillary distances based on the calibrated inter-pupillary distance;
   generating a second plurality of view matrices, each view matrix corresponding to a different inter-pupillary distance within the second range of inter-pupillary distances;
   rendering a second plurality of holograms, each hologram rendered using a different view matrix from the second plurality of view matrices;
   displaying the second plurality of holograms on the display at the reference location;
   outputting a second instruction to the user of the head mounted display device to move the user's head while viewing the second plurality of holograms and to select a second hologram from among the second plurality of holograms with a most stable appearance; and
   recalculating the calibrated inter-pupillary distance based on the view matrix of the selected second hologram.

19. The method of claim 18, wherein the second range of inter-pupillary distances is a smaller range than the first range of inter-pupillary distances.

20. A head mounted display device for motion based view matrix tuning comprising:
an at least partially see-through display;
a processor;
a non-volatile storage device holding instructions executable by the processor to:
generate a first plurality of view matrices, each view matrix corresponding to a different inter-pupillary distance within a first range of inter-pupillary distances;
render a first plurality of holograms, each hologram rendered using a different view matrix from the first plurality of view matrices;
display the first plurality of holograms concurrently on the display at a reference location that is at least a threshold distance away from a rendering focal plane of the head mounted display device;
receive a user selection indicating a hologram from among the first plurality of holograms with a stable appearance when the user's head is moving;
determine a calibrated inter-pupillary distance based on the view matrix of the selected hologram; and
calibrate the head mounted display device based on the calibrated inter-pupillary distance.

\* \* \* \* \*